United States Patent

[11] 3,604,946

| [72] | Inventor | Edward F. Prozeller<br>Ellicott City, Md. |
|---|---|---|
| [21] | Appl. No. | 819,902 |
| [22] | Filed | Apr. 28, 1969 |
| [45] | Patented | Sept. 14, 1971 |
| [73] | Assignee | The United States of America as represented by the Secretary of the Navy |

[54] DUTY-CYCLE PHASE DETECTOR
5 Claims, 7 Drawing Figs.

[52] U.S. Cl. .................................................. 307/232,
307/295, 328/134, 329/101, 329/104, 329/110
[51] Int. Cl. ...................................................... H03k 5/20
[50] Field of Search .......................................... 307/232,
262, 295; 328/109, 110, 133, 134; 329/101, 103,
104, 110; 324/83 A

[56] References Cited
UNITED STATES PATENTS

| 2,335,265 | 11/1943 | Dodington | 328/134 X |
| 2,820,143 | 1/1958 | O'Nelly et al. | 328/134 X |
| 2,900,506 | 8/1959 | Whetter | 307/232 |
| 2,943,263 | 6/1960 | Czina et al. | 328/134 |
| 3,119,064 | 1/1964 | Hillis | 328/133 X |
| 3,212,013 | 10/1965 | Hillis | 307/232 X |

Primary Examiner—Stanley D. Miller, Jr.
Attorneys—R. S. Sciascia and J. A. Cooke ABSTRACT: A phase detector circuit in which the rectifying elements conduct for a fraction of the reference period and therein determine the relative phase difference between an unknown input signal and a reference signal. This is primarily accomplished by obtaining from the reference signal switching functions that are of fractional duty cycle as compared to the unknown signal. The output of this fractional duty cycle phase detector is a DC voltage whose level is proportional to the phase difference between the reference and the unknown input signal.

INVENTOR
EDWARD F. PROZELLER

INVENTOR
EDWARD F. PROZELLER 3,604,946

DUTY-CYCLE PHASE DETECTOR

This invention relates generally to circuits for phase detection and more particularly to phase detectors utilizing only fractional reference duty cycles.

Conventional phase detectors are typically full-wave rectifier-type circuits in which the maximum detector output voltage is fractional to the DC value of a full-wave rectified sine example However, in the instant invention an increased phase detector gain can be achieved by allowing the rectifying components to conduct for only a fraction of the period of the input signal.

The instant invention will enjoy a wide range of applications and is particularly well-suited for use in a phase-locked receiver. More specifically, this invention will detect phase variations between a reference signal of known frequency and phase and an input IF signal of known frequency but unknown phase. This is accomplished by extracting from the reference frequency a switching function or sampling signal that is of the same frequency as the input signal but has a fractional duty cycle when compared to the input signal. For example in one particular embodiment of the instant invention the fractional duty cycles that are utilized as the switching function are quarter duty-cycles. The input signal is applied across the primary of an input transformer that has dual secondaries. On one end of the first secondary is applied one fractional duty cycle switching function. At the other end of said first secondary of said input transformer is an RC filter network. This network structure is the same for the second secondary except that said secondary serves as an inversion and the switching function is 180° out of phase with the switching function associated with the first secondary. Thus, it can be seen that a portion of the input signal will be applied to the filters only when the switching functions or sampling signals are in a closed or sampling condition. At such time when said switch is closed that portion of the input waveform will be converted, by filtering, into a proportionate DC voltage level.

Therefore, when the phase angle of said input waveform changes, a different portion of said waveform will be inputted by the switching functions to the filters and be converted into a different DC voltage level. Thus, the instant invention provides a new and useful phase detector that denotes changes in the phase relationship between a reference and an input signal by a variable DC voltage level and more particularly accomplishes this by utilizing a switching function signal that has a fractional duty cycle.

It is therefore an object of this invention to provide a novel phase detector that utilizes only partial duty cycles with regard to the input signal.

It is a other object of this invention to provide a phase detector that has an increased gain as compared to conventional detectors.

A further object of this invention is to provide a novel phase detector that allows wide dynamic-range input signals to be handled without appreciable limiting.

A still further object of this invention is to provide a phase detector that minimizes voltage offsets within the circuit.

Other objects, function, and characteristic features of the instant invention will become more apparent and discernible as the description of the subject invention proceeds and will in part be obvious from the drawing, wherein.

Figure 4:
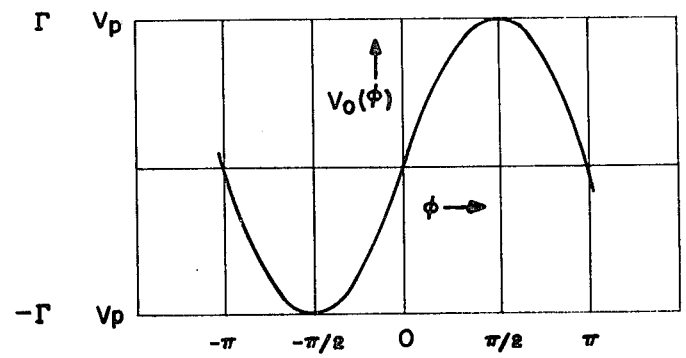
Figure 5:
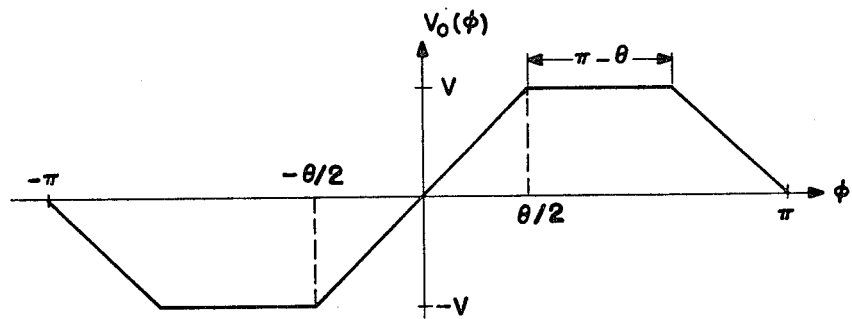
Figure 6:
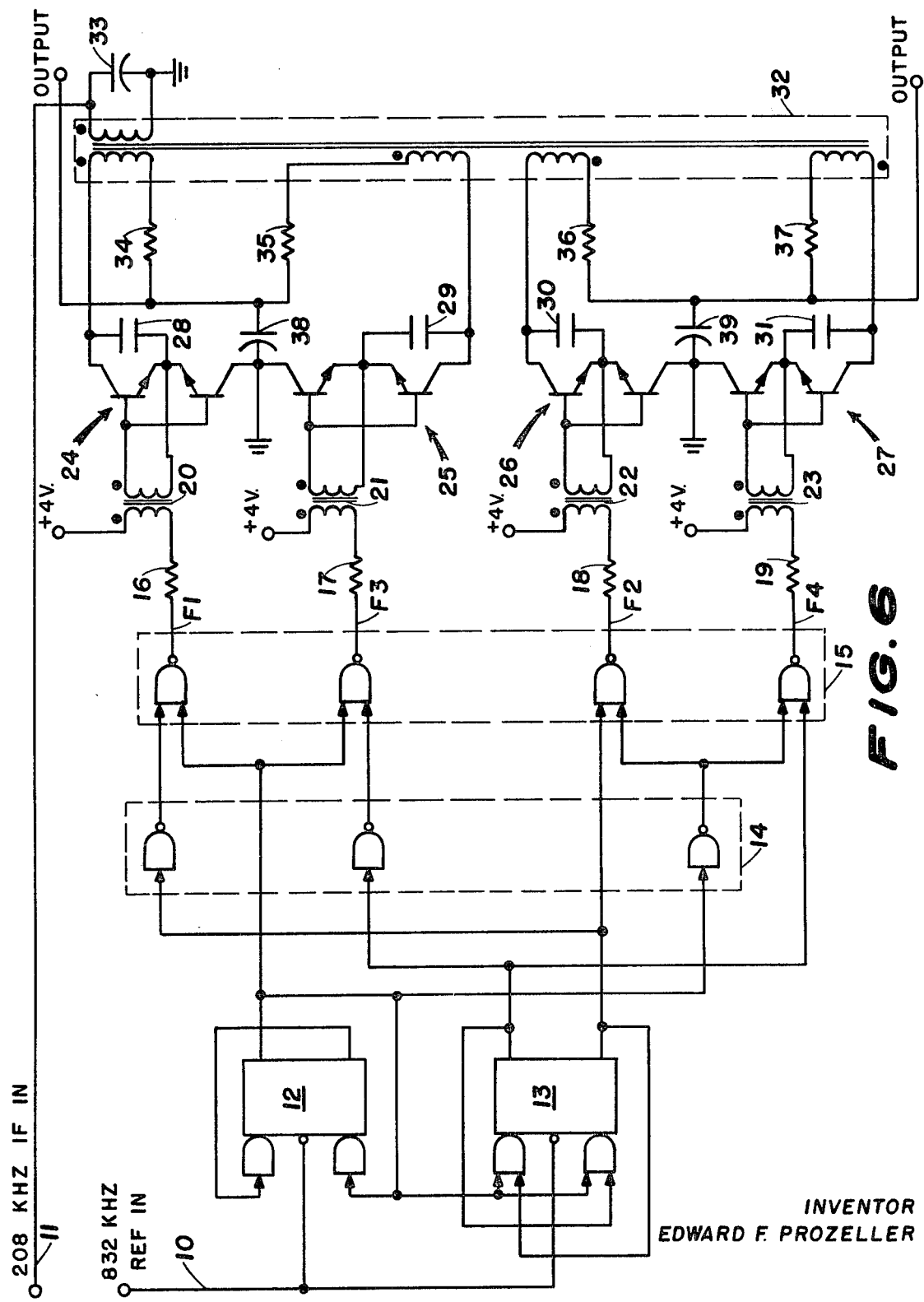
Figure 7:
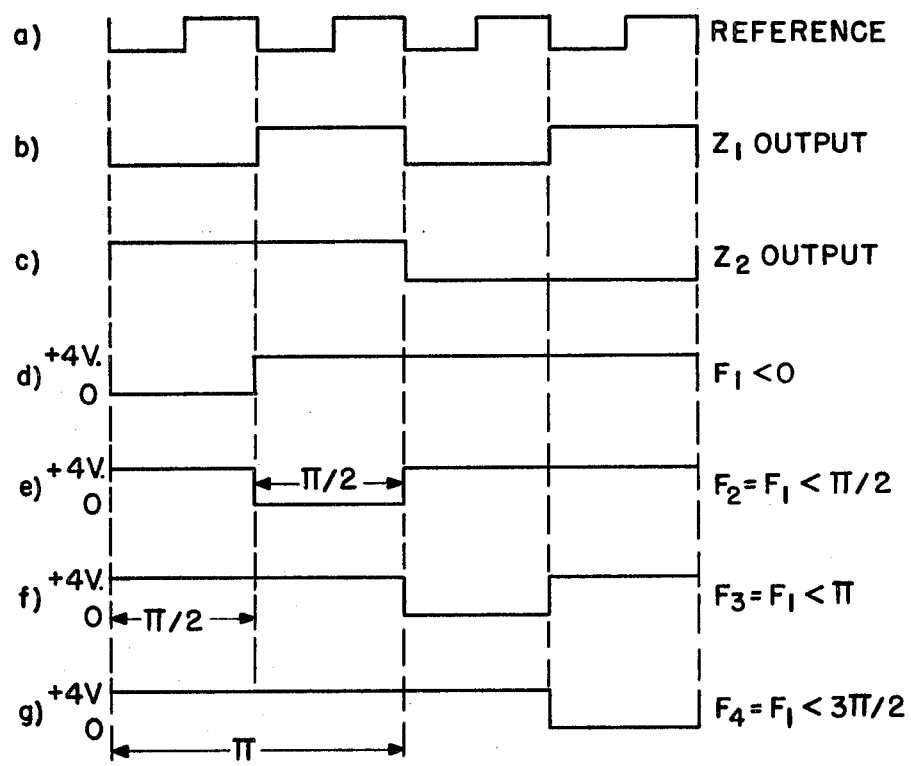

FIG. 4 portrays phase detector output gain characteristics for sinusoidal inputs;

FIG. 5 portrays the phase detector output gain characteristics for square wave inputs;

FIG. 6 illustrates one embodiment of the instant invention utilized in a quadrature phase detector; and FIG. 7 shows the switching function utilized in the embodiment of FIG. 6.

Figure 2:
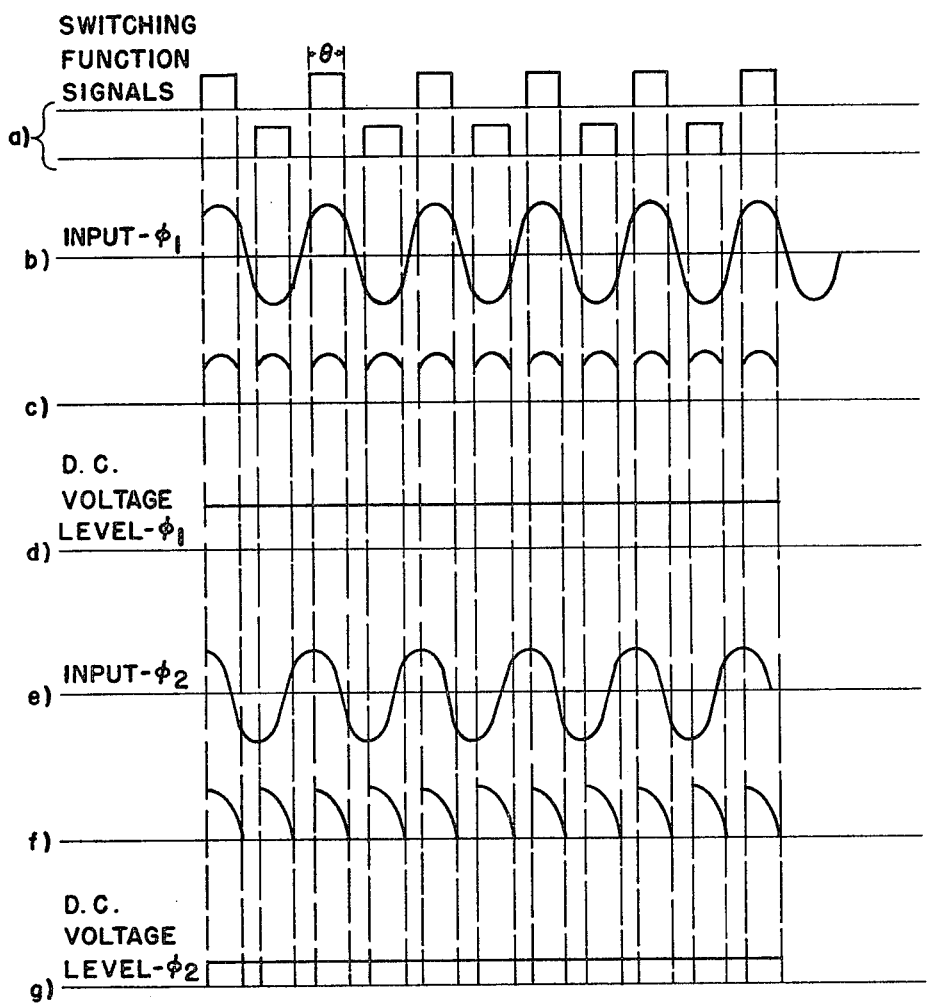
FIG. 2 illustrates various waveforms related to the embodiment shown in FIG. 1.
Figure 1:
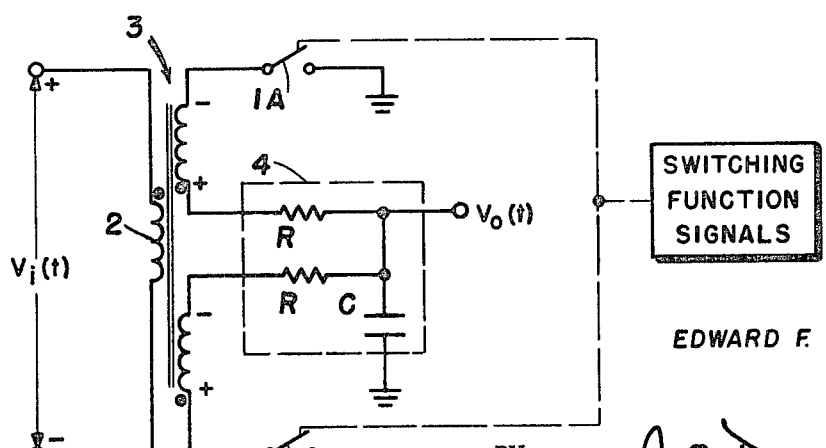
FIG. 1 illustrates a simplified circuit diagram embodying the method and apparatus of the present invention.

Referring now to the drawings, waveform $a$ of FIG. 2 is the switching function signals and is applied to and controls the operation of switches 1A and 1B of FIG. 1; i.e., the position of switches 1A and 1B is determined by the DC voltage level of waveform $a$. The switching function signals, which are derived from the reference signal in a manner to be described in detail hereinafter, is a fractional duty cycle as compared to the duty cycle of the unknown input signal and is also the same frequency as said input signal. The input signal which may be a CW carrier as illustrated by waveform $b$ of FIG. 2, is applied to the primary 2 of transformer 3 in FIG. 1. Thus, it is obvious that only that portion of the input waveform $b$ that is present during the closed or sampling conditions of switches 1A and 1B will be applied to filter 4. The resultant signal that is applied to an RC filter 4 is depicted at waveform $c$ in FIG. 2. Waveform $d$ illustrates the resultant DC voltage level after filtering.

To further illustrate the method and apparatus of the present invention, consider waveform $e$ in FIG. 2 which represents the input signal after it has undergone a phase shift relative to the condition shown in waveform $b$. Thus, in this latter condition, a different portion )+f) of input signal will be (to filter 4, by the switching function signals of waveform $a$ and the DC output voltage level (waveform $g$) is a smaller value than the DC voltage level of waveform $d$. Therefore, the change in the phase relationship between the reference signal and the unknown input signal is distinctly defined by a proportionate change in the output DC voltage level. It should be pointed out at this time that the switch 1, of FIG. 1, is intended to be illustrative only and may, in fact, represent electronic switching circuitry such as that to be described hereinafter in connection with FIG. 6.

The effect that this switching-type phase detector has upon output voltage will now be determined. The input to filter 4 is completely described by $$E_i(t) = \sigma_1(t) V_p \sin(\omega_i t + \Phi) + \sigma_2(t) V_o(t) \quad (1)$$

where, $\sigma_1(t)$ and $\sigma_2(t)$ are mathematical switching functions $V_p$ is the peak input voltage $\Phi$ is the unknown phase difference Functions $\sigma_1(t)$ and $\sigma_2(t)$ can be expressed as even functions in a Fourier series:

$$\sigma_1(t) = \sum_{n=1}^{\infty} A_n \cos n\omega_r t \quad (2)$$

$$\sigma_2(t) = B_0 + \sum_{n=1}^{\infty} B_m \cos m 2\omega_r t \quad (3)$$

Substitution of equasion (2) and (3) into equation (1) yield $$E_i(t) = V_p \left\{ \sum_{n=1}^{\infty} \frac{A_n}{2} [\sin(\omega_i t + \varphi) + \sin(\omega_i t + n\omega_r t + \varphi)] \right\} + V_o(t) \left( B_0 + \sum_{m=1}^{\infty} B_m \cos m 2\omega_r t \right) \quad (4)$$

Since filter 4 constitutes a low-pass filter, its output $V_o(t)$ is equal to the input $E_i(t)$ minus all the high frequency terms of $E_i(t)$. Further, if it is required that $$(\omega_i - \omega_r) \ll \text{minimum}(\omega_i, \omega_r), \quad (5)$$

$E_i(t)$ may be replaced by $V_o(t)$ in equation (4), provided we retain only the difference frequency terms with $n=1$. Making these changes to equation (4) and rearranging yields $$V_o(t) = \frac{A_1}{2(1-B_0)} V_p \sin(\omega_i t - \omega_r t + \varphi) \quad (6)$$

In equation (6), $A_1$ is the fundamental components of $\sigma_1(t)$, $$A_1 = \frac{1}{\pi}(4) \int_0^{\theta/2} \cos \omega_r t \, d\omega_r t = \frac{4}{\pi} \sin \theta/2 \quad (7)$$

and $B_0$ is the DC value of $\sigma_2(t)$ $$B_0 = \frac{1}{\pi} \int_0^{\pi-\theta} d\omega_r t = 1 - \frac{\theta}{\pi} \quad (8)$$

where $\theta$ is the width of the switching interval as illustrated in waveform (a), FIG. 11.

The transformation gain constant $\Gamma$ is defined as the ratio of the peak output voltage to the peak input voltage. Substitution of equation (7) and (8) into equation (6) gives $$\Gamma = \frac{A_1}{2(1-B_o)} = \frac{\sin \theta/2}{\theta/2} \qquad (9)$$

Hence, it is seen that for a switching-type phase detector with a sinusoidal input at a frequency $\omega_i$ and a fundamental reference frequency of $\omega_r$, the output voltage is given by $$V_o(t) = \Gamma V_p \sin (\omega_i t - \omega_r + \Phi). \qquad (10)$$

Figure 3:
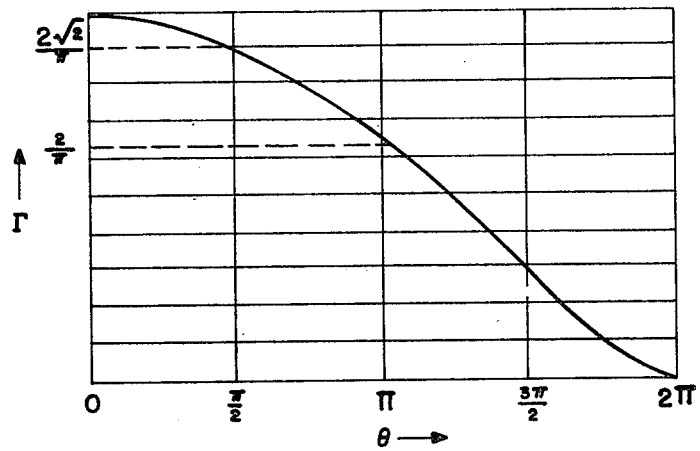
FIG. 3 is a plot of the transformation gain constant of the instant invention versus switching interval of the switching function for quarter duty-cycle phase detectors.

The variation of $\Gamma$ with the switching interval is shown in FIG. 3. The value of $2/\pi$ represents prior art maximum phase detector gain. However, maximum gain for the switching type phase detector of the present invention is found to be $2\sqrt{2}/\pi$ for ¼ duty-cycle switching.

It will now be shown that the transformation gain constant of the switching-type phase detector for any input waveform is equal to the maximum average value of the input signal over the interval for which the switch 1 in FIG. 1 is closed. To determine this consider capacitor C in the filter 4 of FIG. 1 to be initially uncharged. When switch 1 is closed for the first time, the input to the filter 4 becomes $\theta/2\pi$ cycle of a sine wave, where the portion of the cycle is determined by $\Phi$. The output of the filter 4 after a number of switch closings will be the average value of that portion of the input that is present during the duration of the switch closing (sampling time) since the filter capacitor cannot discharge when the switch 1 is open. Therefore, $V_o(\omega)$ becomes $$V_o(\omega) = \frac{1}{\theta} \int_{-\theta/2}^{+\theta/2} V_p \sin (\omega_i t + \varphi) d\omega_i t = V_p \left(\frac{\sin \theta/2}{\theta/2}\right) \sin \varphi \qquad (11)$$

Equation 11 represents what is called the phase detector output gain characteristic for sinusoidal inputs and is shown plotted in FIG. 4.

For a square wave input, the output characteristic may be obtained by considering $\Phi$ in various intervals. First, for $$\theta/2 \leq \varphi \leq \pi - \theta/2 \qquad (12)$$

$$V_o(\varphi) = \frac{1}{\theta} \int_{-\theta/2}^{+\theta/2} V d\omega_i t = V \qquad (16)$$

This is the maximum value that $V_o(t)$ can assume and hence the transformation gain constant for a square wave input is equal to unity. The phase detector output gain characteristic for square wave inputs is shown in FIG. 5. In the general case, the phase detector characteristic for a square wave input is trapezoidal in shape. The width of the flat top is equal to $\pi-\theta$ radians and the characteristic is linear over the range $\pm\theta/2$ radians. The gain of the phase detector over the linear range is $2v/\theta$ volts per radian.

Detailed circuitry forming one specific embodiment of the instant invention is shown in FIG. 6 and is especially adapted to be utilized in quadrature phase detector assemblies. More specifically, reference signal on line 10 e.g. from a 832 kHz. source) which is at four times the incoming IF frequency on line 11 (e.g. from a 208 kHz. source) is divided down to the IF frequency by flip-flops 12 and 13, as represented by waveforms b and c in FIG. 7. Because the flip-flop delays are not exactly the same, direct decoding of the flip-flop signals would cause spurious pulses to occur at the gate outputs whenever the slowest flip-flop changes state. To prevent this for occurring, a separate integrated circuit multiple-gate clip 14 is used to delay three of the four flip-flop outputs before decoding. The direct outputs from flip-flops 12 and 13 are then combined with the delayed outputs in integrated circuit gates 15 to generate the switching functions $F_1$ through $R_4$, as shown at waveforms d through g respectively in FIG. 7. As will be described in more detail hereinafter, switching functions $F_1$ and $F_3$ are used to drive one phase comparator network and functions $F_2$ and $F_4$, which are in quadrature with $F_1$ and $R_3$, are used to drive another.

More specifically, the switching function outputs of gating network 15, having a sampling rate equal to he IF frequency, are connected, via resistors 16 through 19, to the primary windings of switching transformers 20 through 23. Whenever one of the switching functions F goes to ground, current flows through the primary winding of the associated switching transformer 20–23. The transformer polarity is such that the current induced in the secondary winding flows into the bases of an associated two-transistor switch 24, 25, 26 or 27, driving the switch on and into saturation. Each switching transformer 20–23 has a turns ratio of 2:1; therefore, while a transistor switch is saturated a constant voltage is reflected across the primary winding of the associated switching transformer. The current in the secondary winding of a switching transformer is equal to the turns ratio times the primary current minus the magnetizing current of the switching transformer. Because the transformer voltage during a pulse is constant, a triangular magnetizing current will flow.

When one of the switching functions $F_1$ through $F_4$ goes positive (see FIG. 7), the secondary current of the associated transformer 20–23 ceases to flow and the associated switching transistor pair 24–27 turn off. Since the secondary circuit is now open circuited, the switching transformer discharges its magnetizing current through the associated primary circuit including one of the resistors 16–19 and the collector impedance of the associated integrated circuit gate of chip 15. This discharge causes the collector voltage of gating network 15, to rise; however, because the diffused collector impedance of the integrated circuit acts like a forward-biased diode during primary discharge, the collector voltage is clamped until discharge is completed.

In view of the above, it will be noted that dual transistors 24 through 27 act as phase detector switches, with transistors 24 and 25 driven by switching functions $F_1$ and $F_3$ through transformers 20 and 21 to form one phase comparator and transistors 26 and 27 driven by functions $F_2$ and $F_4$ to make up the other phase comparator. More specifically, a phase detector switch "closes" when enough base current is supplied by the associated switching transformer 20–23 to saturate both transistors in the connected pair on. Depending upon the polarity of the voltage to be switched, one transistor in the pair always works in the inverted mode (i.e., collector and emitter interchanged) and, since inverted $\beta$ is low, this transistor will require proportionally more of the base current. On the other hand, a phase detector switch "opens" when the base current is zero. In this case, the collector-base junction of one transistor in the pair is reverse biased and the collector-base junction of the other is forward biased, providing a path for the leakage current of the off transistor. The base circuitry of the switch will float either at ground, if the voltage to be switched is positive, or at the switch collector voltage, if it is negative. Capacitors 28 rough 31 act to compensate for voltage offsets within the transistors switches 24 through 27.

The IF input transformer assembly 32 contains four secondaries, each serving as an input for one of the transistor switches 24 through 27 and providing the polarity inversion required in one channel of each phase detector. The IF input tank circuit, consisting of the input transformer inductance shunted by capacitor 33, is designed for a low Q so that the input impedance will be primarily resistive for a wide range of frequencies about the resonant frequency. Since quarter duty-cycle switching is used, only one phase comparator switch is closed at a time.

The output filters are formed of resistors 34 through 37 and capacitors 38 and 39. Each output filter must have cutoff frequencies that are low enough to assure high rejection of the IF and reference frequencies, but yet high enough to preserve the output bandwidth of the IF amplifier. This is accomplished by making the filter cutoff frequency about ten times greater than the IF bandwidth.

I claim:

1. A phase detector for determining the difference in the phase angle between a first periodically varying signal of known frequency and phase angle and a second periodically varying signal of known frequency and unknown phase angle, comprising:

a source of a first periodically varying signal;

a source of a second periodically varying signal, the frequency of said first periodically varying signal being greater than that of said second periodically varying signal;

flip-flop circuit means connected to said source of first periodically varying signal for producing a switching function signal from said first periodically varying signal wherein said switching function signal will be equal in frequency to said second periodically varying signal but will only be produced by said flip-flop means for a predetermined discrete interval during each cycle of said second periodically varying signal;

delay gate means operably connected to said flip-flop circuit means for compensating for spurious pulses generated by uneven flip-flop delays;

an AND gate for combining the outputs of said flip-flops circuit means and said delay gate means; filtering means; a means responsive to said switching function signal for applying said second periodically varying signal to said filtering means only when said flip-flop means is producing said switching function signal whereby the output of said phase detector will be a DC voltage level that will vary as the phase relationship varies between said first and second periodically varying signals.

2. The phase detector as claimed in claim 1 wherein said means for applying to said filtering means that portion of said second periodically varying signal which occurs when said flip-flop means is producing said switching function signal comprises a transformer having a primary winding connected to said source of second periodically varying signal and having a secondary winding, one end of which is connected to said switching function signal and the other end of which is connected to said filtering means.

3. The phase detector as claimed in claim 2 wherein said filtering means is a resistor-capacitor bridge network.

4. The phase detector as claimed in claim 3 wherein said sources of said first and second periodically varying signals are sine wave oscillators.

5. The phase detector as claimed in claim 3 wherein said sources of said first and second periodically varying signals are square wave oscillators.